United States Patent
Amerga et al.

(10) Patent No.: US 8,145,132 B2
(45) Date of Patent: Mar. 27, 2012

(54) METHOD AND APPARATUS FOR REDUCING FREQUENCY SPACE FROM FREQUENCY SEARCH

(75) Inventors: Messay Amerga, San Diego, CA (US);
Vivek Chawla, San Diego, CA (US);
Deepali Garg, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 765 days.

(21) Appl. No.: 12/212,064

(22) Filed: Sep. 17, 2008

(65) Prior Publication Data

US 2009/0131047 A1 May 21, 2009

Related U.S. Application Data

(60) Provisional application No. 60/973,136, filed on Sep. 17, 2007.

(51) Int. Cl.
*H04B 15/00* (2006.01)
*H04B 17/00* (2006.01)
(52) U.S. Cl. .......................................................... 455/62
(58) Field of Classification Search .................. None
See application file for complete search history.

(56) References Cited

U.S. PATENT DOCUMENTS

| | | | |
|---|---|---|---|
| 6,092,040 A * | 7/2000 | Voran ............................ | 704/228 |
| 6,804,262 B1 * | 10/2004 | Vogel et al. .................... | 370/480 |
| 7,428,270 B1 * | 9/2008 | Dubuc et al. .................. | 375/316 |
| 7,593,367 B2 * | 9/2009 | Amerga et al. ................ | 370/332 |
| 2002/0157106 A1 * | 10/2002 | Uskali et al. ................... | 725/107 |

FOREIGN PATENT DOCUMENTS

| WO | WO9222144 A1 | 12/1992 |
|---|---|---|
| WO | WO2005069650 A1 | 7/2005 |

OTHER PUBLICATIONS

International Search Report and Written Opinion—PCT/US2008/076726, International Search Authority—European Patent Office—Mar. 4, 2009.

* cited by examiner

*Primary Examiner* — Marivelisse Santiago Cordero
(74) *Attorney, Agent, or Firm* — Kenneth K. Vu; Sayed H. Beladi

(57) ABSTRACT

A method and apparatus for reducing frequency space from code space search is disclosed in a wireless network. The method and apparatus reduces the frequency space without compromising the probability of detection, so that user equipment can expedite system acquisition and reduce power consumption. To reduce the frequency space, the described aspects note that the power spectral density of the WCDMA signal is essentially flat within the channel bandwidth. By capturing in-phase quadrature samples and doing frequency domain analysis of the signal in bandwidth around the center frequency, to the described aspects can eliminate some channels from the WCDMA code space search during frequency scan.

34 Claims, 6 Drawing Sheets

METHOD AND APPARATUS FOR REDUCING FREQUENCY SPACE FROM FREQUENCY SEARCH

CLAIM OF PRIORITY UNDER 35 U.S.C. §119

The present Application for Patent claims priority to Provisional Application No. 60/973,136, entitled "Reducing Search Time by Eliminating Channels Based on the Power Spectral Density," filed Sep. 17, 2007, and assigned to the assignee hereof and hereby expressly incorporated by reference herein.

BACKGROUND

1. Field

The invention relates generally to the field of telecommunications, and more particularly to mechanisms for reducing search time in a wireless network based on power spectral density.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Ultra Mobile Broadband (UMB) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

At power up or upon system loss, if the user equipment (UE) cannot acquire a system using the stored channels list (list of channels on which UE has previously camped) then the UE may do a frequency scan. The frequency scan involves a code space search on all frequencies in a given band that have receive power above the receiver noise floor. It may take a relatively long time (2-3 minutes) to complete in a polluted radio frequency environments. Additionally, power consumption for the UE is high in completing the frequency scan. Therefore, the time necessary to acquire a system is heavily dependent on the number of frequencies that must be searched. By reducing the frequency space (that is, the frequencies which must be scanned) without compromising the probability of detection, a UE can expedite system acquisition and reduce power consumption during an out of service search (OOS).

There is therefore a need in the art for reducing the frequency space without compromising the probability of detection.

SUMMARY

A method and apparatus for reducing the frequency space in a frequency space from a frequency search is disclosed which reduces the number of frequencies to be searched without compromising the probability of detection.

In one aspect, there is disclosed a method for locating cells in a wireless communication network, comprising: defining a first set of carrier frequencies to be searched; calculating a power spectral density of one of the first set of carrier frequencies; comparing a metric of the power spectral density of the carrier frequency with a threshold metric; and if the metric of the power spectral density of the carrier frequency meets the threshold metric, including the carrier frequency in a second set of carrier frequencies to be searched.

In another aspect, there is disclosed an apparatus for locating cells in a wireless network, the apparatus comprising: logic for defining a first set of carrier frequencies to be searched; logic for calculating the power spectral density of one of the set of carrier frequencies; and logic for comparing a metric of the power spectral density of the carrier frequency with a threshold metric, wherein if the metric of the power spectral density of the carrier frequency meets the threshold metric, logic for including the carrier frequency in a second set of carrier frequencies to be searched.

In another aspect, there is disclosed an apparatus in a wireless communication system for locating cells in a wireless network, the apparatus comprising: means for defining a first set of carrier frequencies to be searched; means for calculating the power spectral density of one of the set of carrier frequencies; and means for comparing the metric of the power spectral density of the carrier frequency with a threshold metric, wherein if the metric of the power spectral density of the carrier frequency meets the threshold variance, including the carrier frequency in a second set of carrier frequencies to be searched.

In another aspect, there is disclosed a computer program product in a wireless communication system for locating cells, comprising: a computer-readable medium comprising: a first set of codes for causing a computer to define a first set of carrier frequencies to be searched; a second set of codes for causing the computer to calculate the power spectral density of one of the set of carrier frequencies; a third set of codes for causing the computer to compare a metric of the power spectral density of the carrier frequency with a threshold metric; and if the metric of the power spectral density of the carrier frequency meets the threshold metric, including the carrier frequency in a second set of carrier frequencies to be searched.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
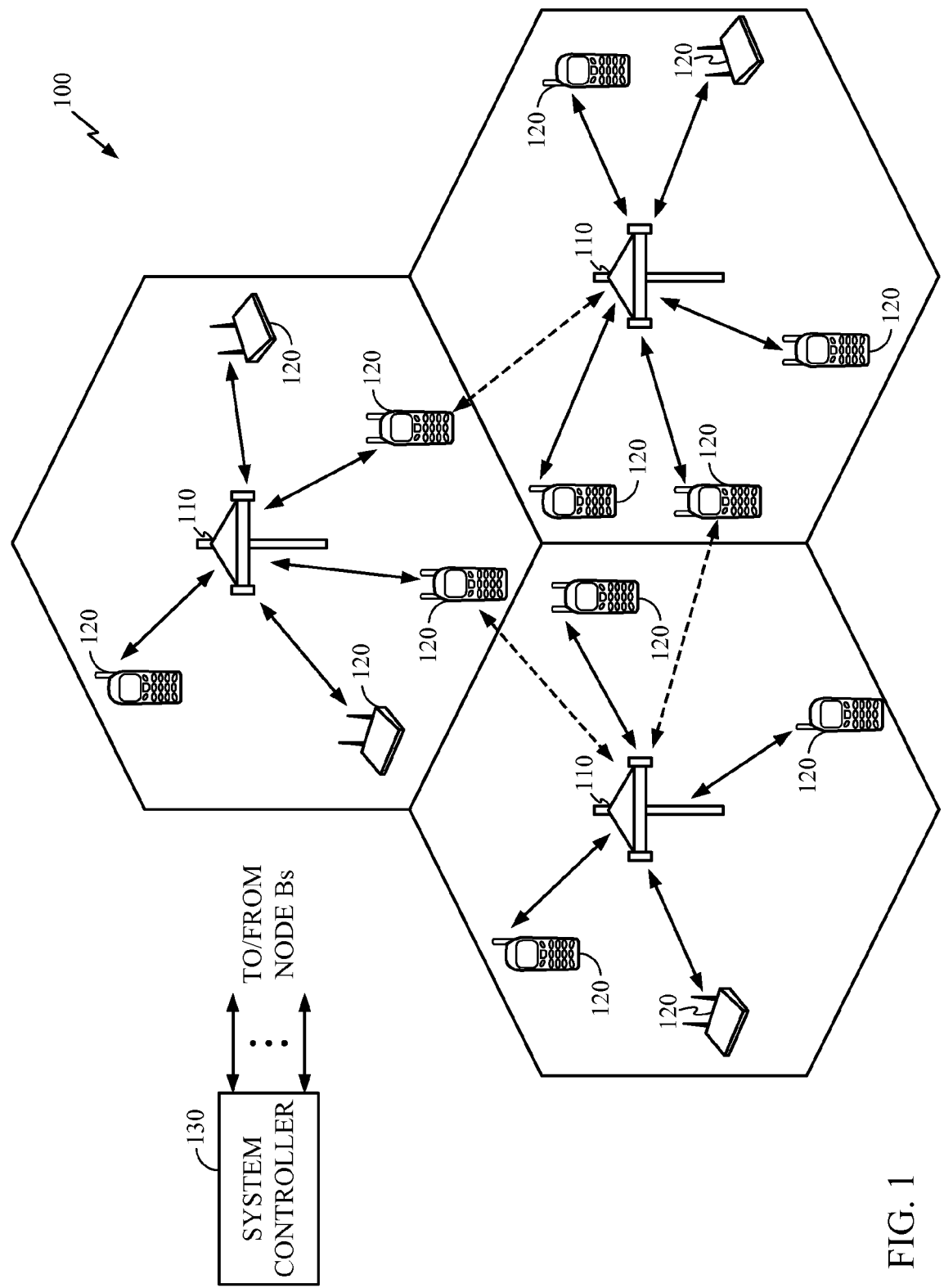
FIG. 1 illustrates a multiple access wireless communication system according to one aspect.

Referring to FIG. 1, a wireless communication system 100 with multiple Node Bs 110 and user equipments (UEs) 120 is shown. A Node B is generally a fixed station that communicates with the UEs and may also be referred to as an evolved Node B (eNB), a base station, an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc.

Figure 2:
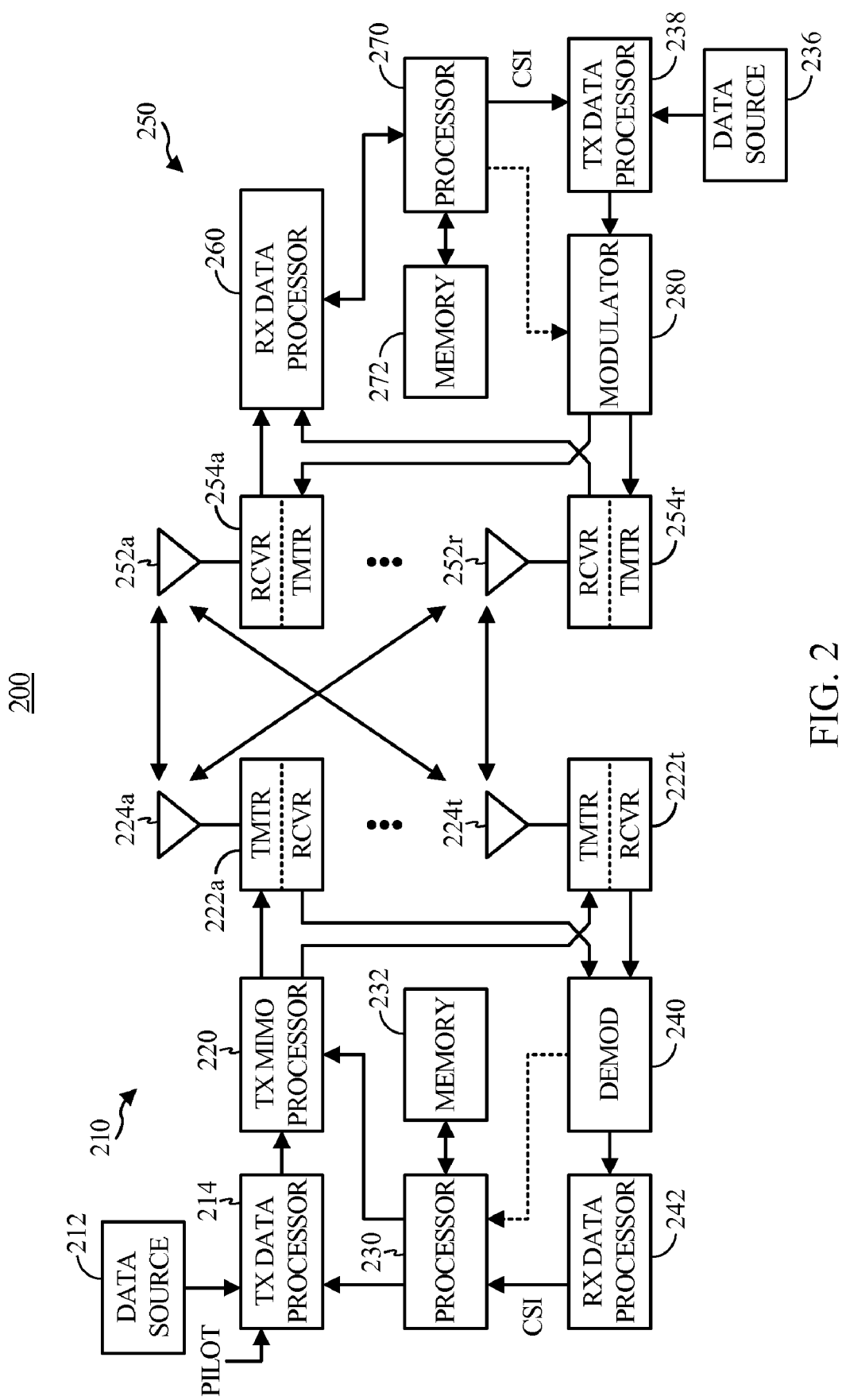
FIG. 2 is a block diagram of a communication system.

FIG. 2 is a block diagram of an aspect of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Even when it is not actively engaged in a call, UE that has been switched on for a while typically "camps on" a control channel of a suitable base station. This enables the UE to be informed and to respond when it is the recipient of a call, and also enables the user to quickly initiate calls.

However, when the UE is first switched on, or when the network has been lost for a long time (when the UE has been out of a coverage area for a long time), the terminal must perform an initial cell search procedure to identify which cells (each associated with a base station) are available. The UE will select the best of the available cells that it finds from the search.

Because the UE might "wake up" essentially anywhere (e.g., in a country different from the one in which it was last switched on) the initial cell search typically involves searching for the presence of control channels throughout an entire available RF band.

An exemplary aspect relating to the Wideband Code Division Multiple Access (WCDMA) standard of mobile communication will now be presented to illustrate an initial cell search process. The described aspects presented herein should not be considered limited to use only in WCDMA systems, however, since these aspects are equally applicable to other mobile communication systems as well.

To devise a means to reduce the frequency space, the described aspects note that the power spectral density (PSD) of the WCDMA signal is essentially flat within the channel bandwidth. By capturing in-phase quadrature (IQ) samples and doing frequency domain analysis of the signal in bandwidth around the center frequency, the described aspects may eliminate some channels from the WCDMA code space search during frequency scan. If the signal is a narrowband jammer or from alternate technology (such as GSM, CDMA, etc.) transmitting a narrowband signal, the PSD within the WCDMA channel bandwidth is not expected to be flat. The flatness can be quantified by a metric of the power spectral density of the received signal within the channel bandwidth. The following exemplary aspect relates to the variance of the power spectral density as a measure of the flatness of the power spectral density of the received signal. The described aspects presented herein should not be considered limited to only the variance, however, since other metrics relating to the power spectral density are equally applicable. Such other metrics may be the mean or the standard deviation of the power spectral density.

Figure 3:
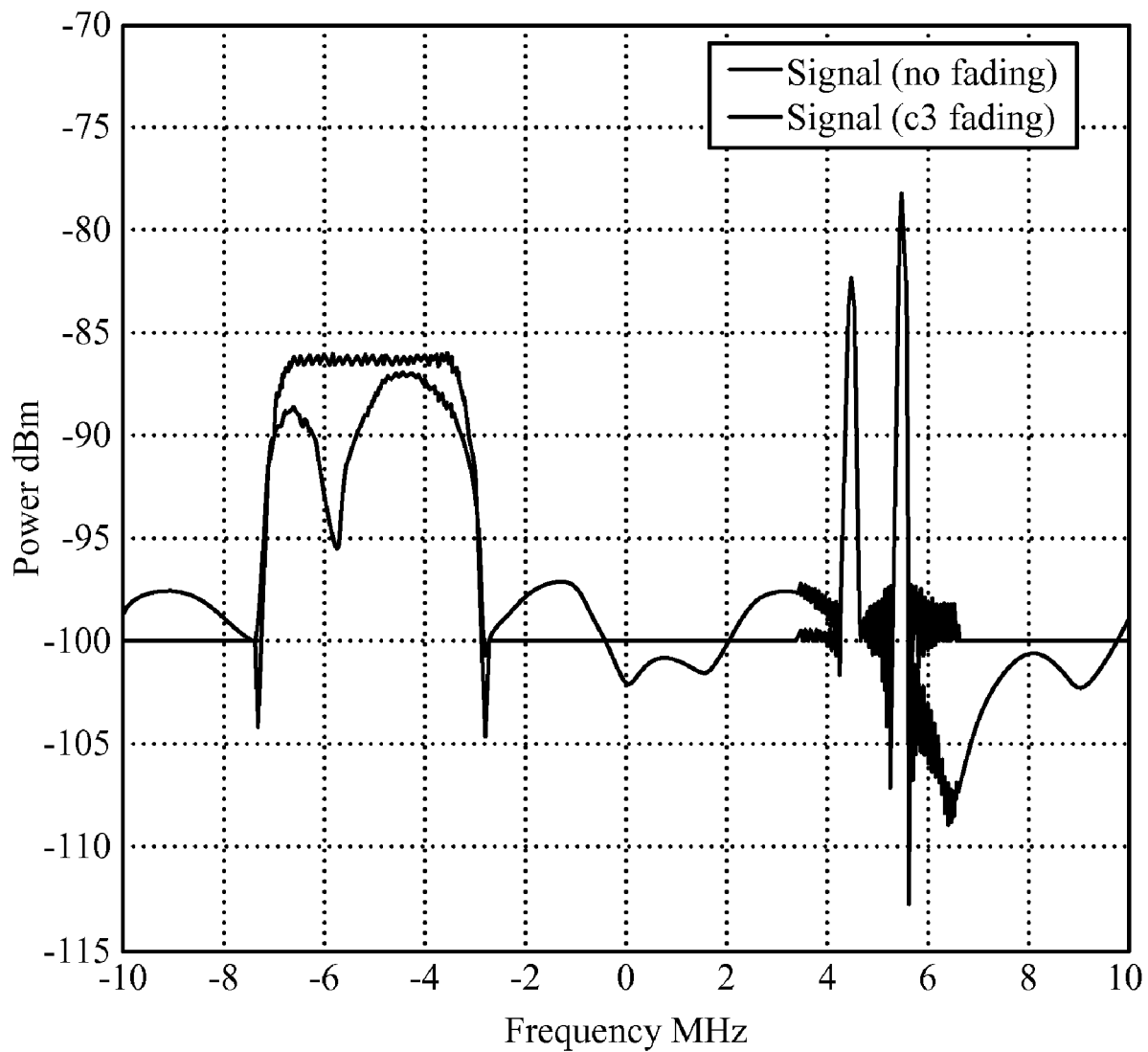
FIG. 3 is a graph of power spectral density.

For instance, FIG. 3 is a graph of WCDMA pulse and two GSM pulses. The WCDMA pulse is centered at −5 MHz, and channels are spaced apart by 10 kHz. As can be seen, at ±1.6 MHz around the center frequency, the WCDMA pulse signal is essentially flat with minimal variance.

The PSD variance of an ideal WCDMA signal is negligible (close to 0) assuming AWGN channel and sufficiently large length of input samples and FFT. Additionally, empirical data from real world environments show that the PSD variance of commercially deployed WCDMA signals is less than 3 dB in moving conditions when computed using 1 slot of IQ data and 32-length FFT. If the variance is significantly larger (>12 dB), the center frequency is eliminated from the WCDMA code space search.

In a conventional initial cell search, for example, in the Universal Mobile Telecommunications System (UMTS), the goal is to identify a carrier frequency that is being used by a cell associated with a target public land mobile network (PLMN). To start out this search, an initial search list is put together that includes all valid UMTS Absolute Radio Frequency Channel Numbers (UARFCN). To begin the actual searching, the first UARFCN in the history list is selected and then a search loop is entered that runs a cell search on the selected UARFCN and removes the UARFCN from the initial search list. If a new cell is found, information received from the cell is used to determine whether it is from the target PLMN. If the cell is from the target PLMN, then the search algorithm need not look further.

However, if the found cell is not from the target PLMN, all UARFCNs that are ±0.3 MHz from the UARFCN associated with the found cell are removed from the initial search list. If a cell had not been found on the selected UARFCN, a determination is made whether the last UARFCN in the history list had been selected. If not, the next UARFCN in the history list is selected (block 133), and the loop is repeated.

Subsequently, the initial search list is reduced by filtering out frequencies based on their Received Signal Strength Indicators (RSSI). This filtering includes making an RSSI scan on each UARFCN in the initial search list and for any of the frequencies that are ± a predetermined frequency band from the center frequency, removing all UARFCNs from the initial search list that satisfy RSSI. Finally, the resulting list is searched 107. The approach taken is to search the most probable frequencies first, and then to search all other frequencies in the search list.

One problem with the conventional initial cell search algorithm is that the search on all carriers can take a long time. In some cases it may take several minutes before it finds an allowable PLMN. One consequence this has on the UE is that time to registration to the network is long, which in turn means that the time from when the UE is first powered on until a call can be made is long. This negatively affects the user of the UE. Another effect on the UE is that power consumption is high when the initial cell search algorithm is being performed.

To reduce the frequency space that must be searched while maintaining the probability of detection, the described aspects note that the power spectral density of the WCDMA signal is essentially flat within the channel bandwidth. By capturing IQ samples and doing frequency domain analysis of the signal in bandwidth around the center frequency, it is possible to eliminate some channels from the WCDMA code space search during frequency scan. If the signal is a narrowband jammer or from alternate technology (GSM, CDMA, etc.) transmitting a narrowband signal, the PSD within the WCDMA channel bandwidth is not expected to be flat. The described aspects quantify the flatness by the variance of the PSD of the received signal within the channel bandwidth. 1 to 2 slot's worth of IQ samples are collected at each center frequency to compute the PSD and its variance. The PSD variance of an ideal WCDMA signal is negligible (close to 0) assuming AWGN channel and sufficiently large length of input samples and FFT. Empirical data from field shows that the PSD variance of commercially deployed WCDMA signals is less than 3 dB in moving conditions when computed using 1 slot worth IQ data and 32-length FFT. If the variance is significantly larger (for example, >12 dB), the center frequency is eliminated from the WCDMA code space search.

During WCDMA frequency scan, device, as referred to as a UE, a receiver system, or an access terminal, includes logic executable by a processor to perform the Step 1-2-3 cell search on the frequencies that meet the receive power threshold. Power scan measures the power in ~±2 MHz band around the center frequency. If the measured power is greater than the threshold, the frequency is a candidate for WCDMA cell search. Once all the frequencies in the given frequency band have been scanned, the results are sorted based on the channel receive power and Step 1-2-3 search is performed on these channels starting from the top ranked channel.

Since power scan measures the total channel power ($I^2+Q^2$) and not the code domain power, it is possible that the received power in a given 4 MHz band is due to a narrowband jammer, or an alternate technology (GSM, CDMA, etc.). Yet, in the prior art, no attempts are currently made to distinguish this from the true WCDMA signal power by reducing the frequency space by doing frequency domain analysis frequency domain analysis of signal at each center frequency that meets the receive power threshold.

Figure 4A:
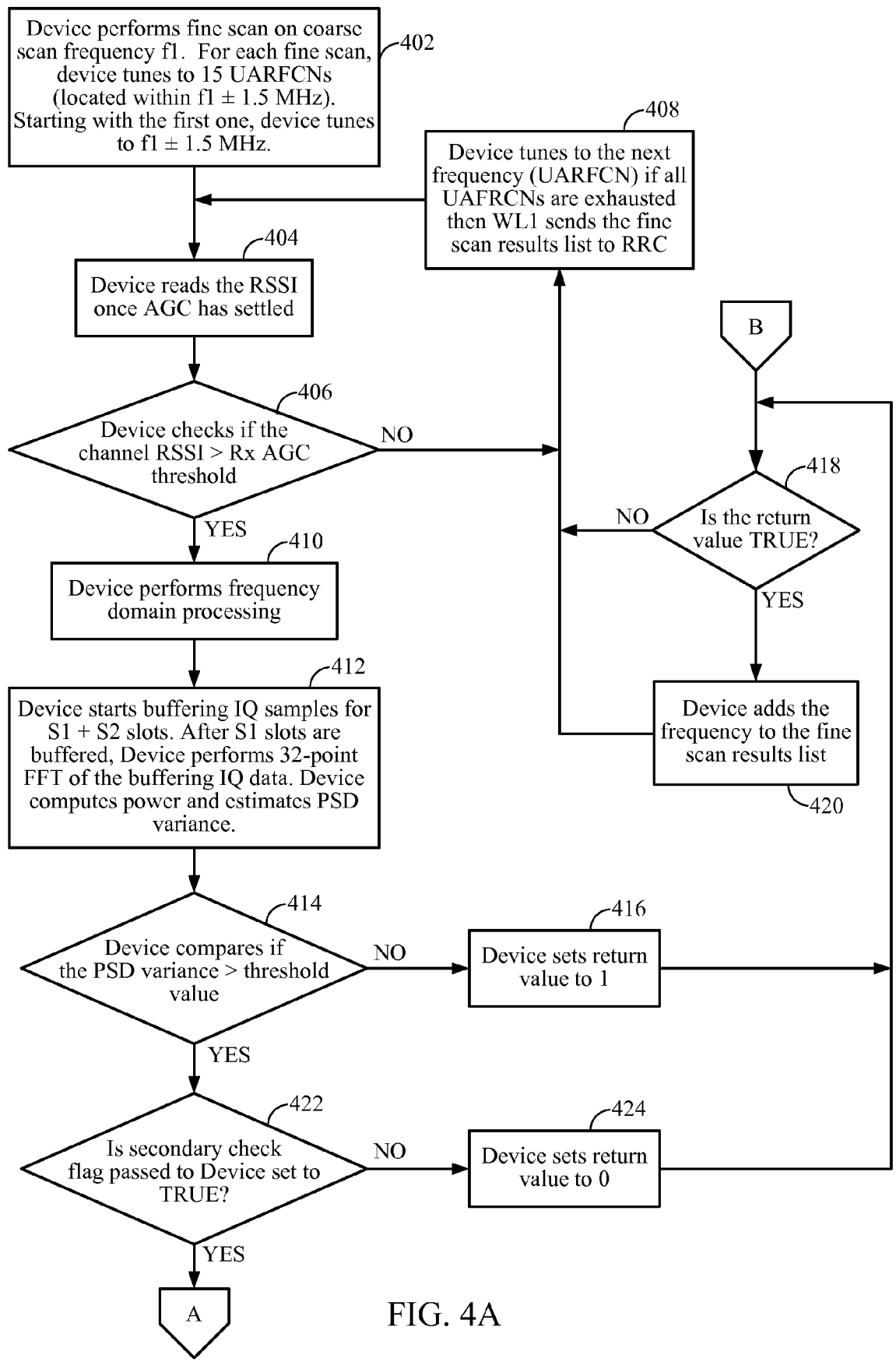
FIG. 4A is a flowchart diagram according to one aspect.
Figure 4B:
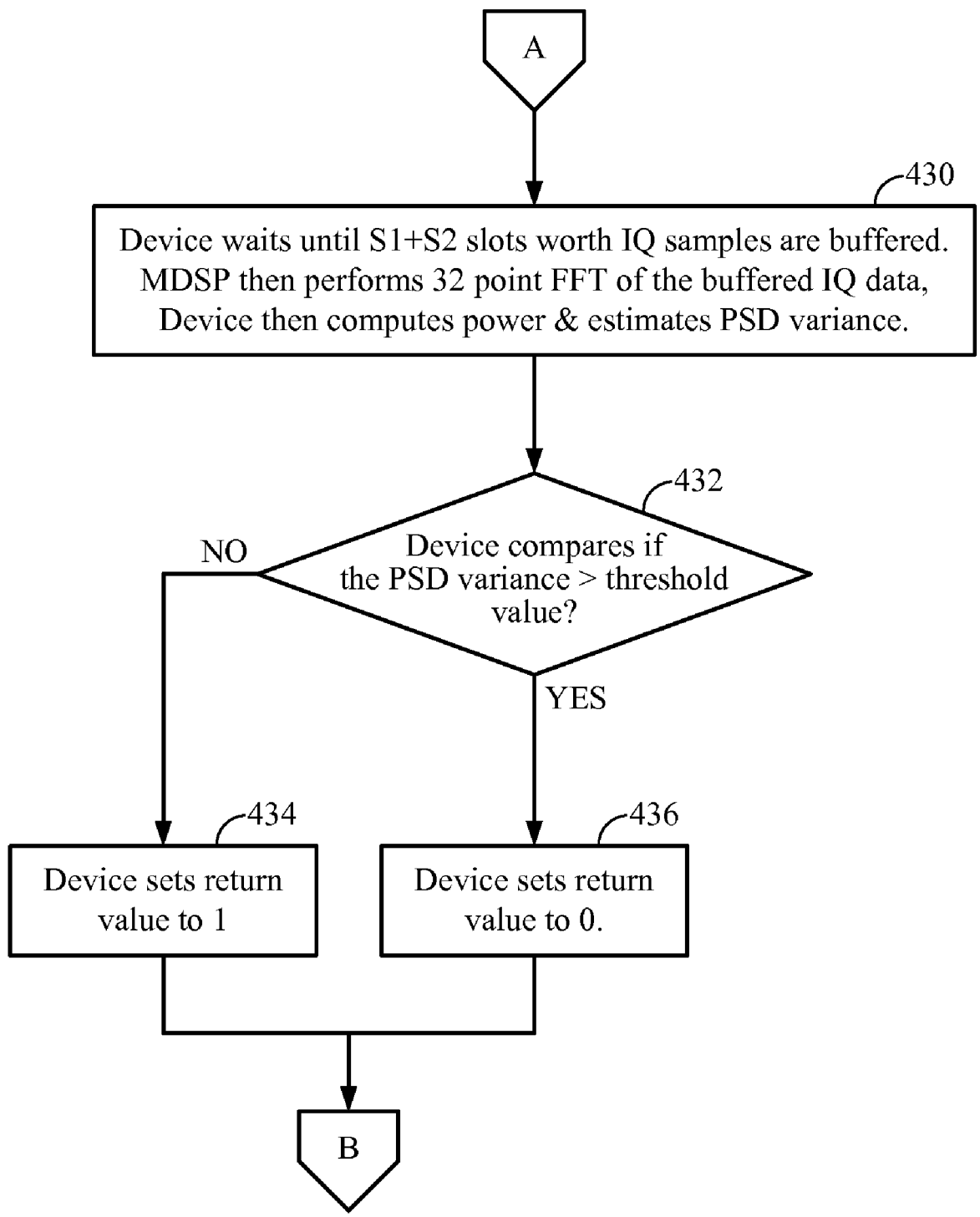
FIG. 4B is a flowchart diagram according to one aspect.

An exemplary aspect of the initial cell search algorithm is described in connection with FIGS. 4A and 4B which are flow charts of an aspect of a method of the new initial cell search algorithm. For example, such aspects may be included in logic executable by a processor of a UE. Briefly, the UE scans frequencies in a "coarse" frequency scan and performs a "fine" frequency scan after candidate frequencies have been added to the fine scan list. A "coarse" frequency scan simply determines if the received power at a candidate frequency exceeds a threshold. If the "coarse" frequency exceeds the received power threshold, the candidate frequency is added to a "fine" scan candidate frequency list to determine if the candidate frequency exceeds a threshold metric based on its power spectral density. The initial cell search procedure may be applied, for example, in the Universal Mobile Telecommunications System (UMTS). The initial cell search is used to identify a carrier frequency that is being used by a cell associated with a target PLMN. Additionally, as used herein, the term "device" shall mean user equipment (UE), radio resource control (RRC), or mobile terminal, or any other hardware, software, or any combination of both, which can perform the described steps for reducing the search time by eliminating channels based on the power spectral density.

To start out the search, an initial coarse frequency search list is put together that includes all valid UMTS Absolute Radio Frequency Channel Numbers (UARFCN). At 402, the device performs a fine scan on coarse scan frequency $f_1$. For each fine scan, the device tunes to 15 UARFCNs which are within $f_1 \pm 1.5$ MHz. Starting with the first coarse scan frequency, the device tunes to $f_1 \pm 1.5$ MHz. At 404, the device reads the initial search list based on their Received Signal Strength Indicators (RSSI) to filter out frequencies.

At decision 406, the device filters out frequencies based on the RSSI. The filtering includes making a RSSI scan on each UARFCN in the initial search list and determining whether each RSSI scan is greater than a predetermined received automatic gain control (AGC) threshold. If the RSSI scan frequency does not meet the AGC threshold, at 408, the device tunes to the next frequency (UARFCN) if all UAFRCNs are exhausted. Then the device sends the fine scan results list to RRC. If the RSSI scan frequency does meet the threshold, at 410, the device initiates multi-processor digital signal processor (MDSP) for performing frequency domain processing.

At 412, the MDSP starts buffering IQ samples for S1+S2 slots. After S1 slots are buffered, the MDSP performs 32-point FFT of the buffered IQ data. The MDSP subsequently computes the power spectral density and estimates the PSD variance. At 414, the MDSP compares if the PSD variance>threshold value of PSD variance. In one exemplary aspect, the threshold value is set to 12 dB.

If, at decision 414, the PSD variance is less than the threshold PSD variance, the MDSP sets a return value for that particular frequency as 1 (TRUE)(416). If the return value is 1 (418), the device adds the frequency to the fine scan list (420). Subsequently, device tunes to the next frequency (UARFCN) if all UAFRCNs are exhausted then device sends the fine scan results list to RRC (408).

If, at decision 414, the PSD variance is more than the threshold PSD variance (most likely indicating an alternative technology such as GSM, CDMA, etc.), the secondary check flag is passed to the MDSP at 422. That is, the frequency is checked twice to ensure that the frequency should not be on the fine scan list. Subsequently, at 430, the MDSP waits until S1+S2 slots worth IQ samples are buffered. MDSP then performs 32 point FFT of the buffered IQ data and the MDSP then computes power & estimates PSD variance. With a new calculation for PSD variance, the MDSP compares the newly calculated PSD variance with the PSD variance threshold value at 432 (12 dB in the exemplary aspect). If, at decision 432, the PSD variance is less than the threshold PSD variance, the MDSP sets a return value for that particular frequency as 1 (TRUE)(434). If the PSD variance is larger than the threshold PSD variance, the MDSP sets a return value for that particular frequency as 0 (FALSE)(436). If the return value is 1 (418), the device adds the frequency to the fine scan list (420). Subsequently, the device tunes to the next frequency (UARFCN) if all UAFRCNs are exhausted then device sends the fine scan results list to RRC.

Turning back to FIG. 4A, if, at step 422, the secondary check flag is not set to TRUE, the MDSP sets a return flag to 0 (FALSE) at 424. Since the return flag is 0 (418), the device tunes to the next frequency (UARFCN)(408). If all UAFRCNs are exhausted then device sends the fine scan results list to RRC (408).

Figure 5:
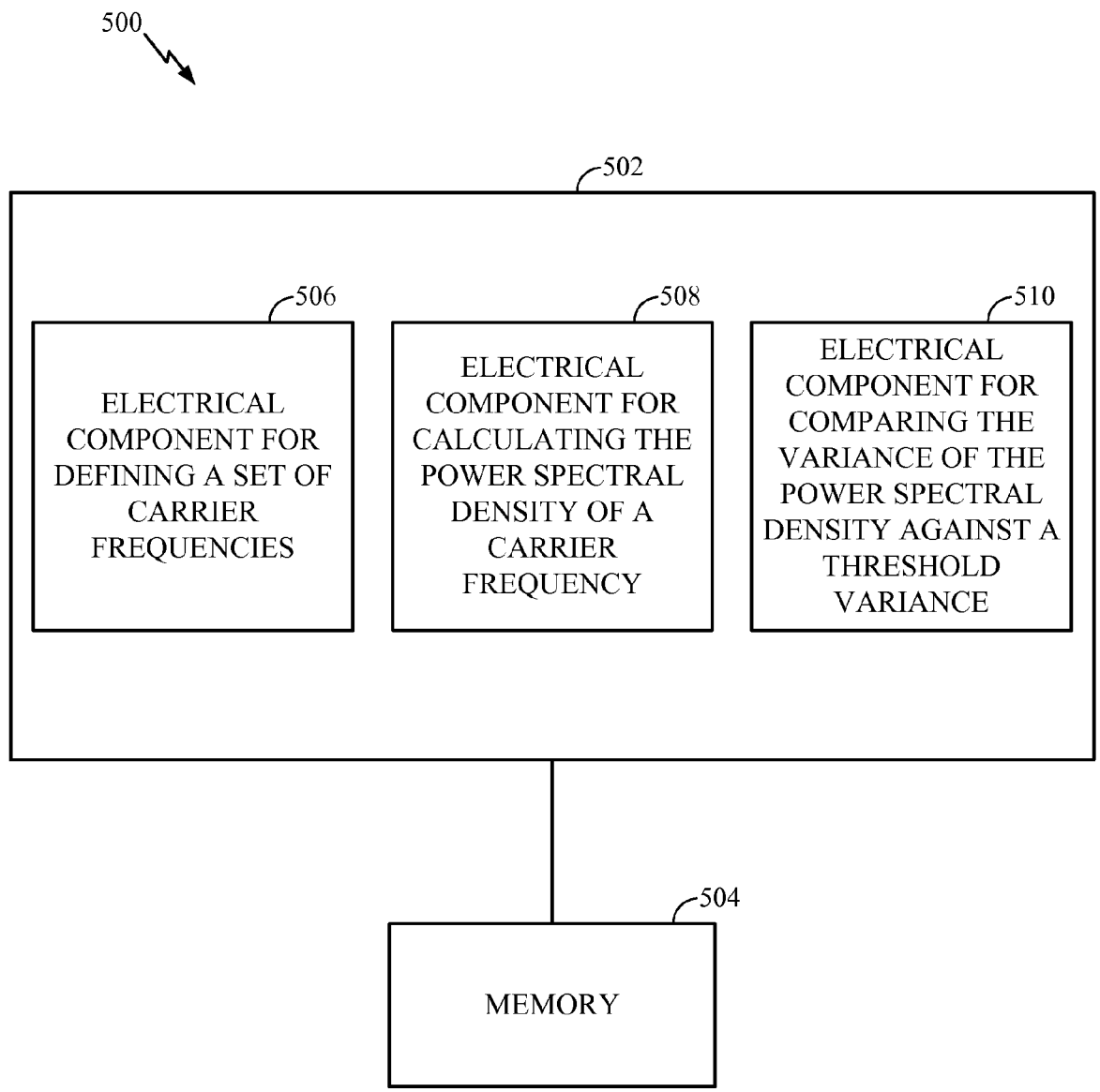
FIG. 5 is a block diagram of an illustrative system according to one aspect.

FIG. 5 illustrates an example system 500 for reducing frequency space from a code space search in a wireless network. The system 500 can reside at least partially within a mobile device and is represented as including functional blocks, which may be functional blocks that represent functions implemented by a processor, hardware, software, or combination thereof (e.g. firmware).

Included in system 500 is a logical grouping 502 of electrical components that can act separately or in conjunction. Logical grouping 502 includes an electrical component 506 for defining a set of carrier frequencies to be searched. The set of carrier frequencies is an initial search list is put together that includes all valid UMTS Absolute Radio Frequency Channel Numbers (UARFCN). Further, the system 500 includes an electrical component 508 for calculating the power spectral density of a carrier frequency. Typically, the power spectral density is a positive real function of a frequency associated with a stationary stochastic process, or a deterministic function of time, which has dimensions of power per Hz, or energy per Hz. and can be stored in a memory, for example. Also included is an electrical component 510 for comparing the variance of the power spectral density of the carrier frequency against a threshold variance.

Additionally, system 500 can include a memory 504 that retains instructions for executing functions associated with electrical components 506, 508, and 510 or other components. While shown as being external to memory 504, it is to be understood that one or more of electrical components can exist within memory 504.

Variations and modifications to this specific design may be made, and this is within the scope of the invention. Also for clarity, various aspects of the frequency search design have been specifically described for a TIA-1121 (UMB) system. However, the frequency search design described herein may also be used for other CDMA systems, such as cdma2000 and W-CDMA systems, and for other wireless communication systems.

Techniques for reducing the search time by eliminating channels based on the power spectral density may be implemented by various means. For example, these techniques may be implemented in hardware, software, or a combination thereof. For a hardware implementation, the technique may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques for reducing the search time by eliminating channels based on the power spectral density may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

The techniques for reducing the search time by eliminating channels based on the power spectral density described herein may be derived/constructed and stored in various types of electronics unit. For example, the algorithm for reducing the search time by eliminating channels based on the power spectral density may be stored in a random access memory (RAM), a dynamic RAM (DRAM), a Flash, and so on. The algorithm may also be stored in temporary memory, registers, latches, and so on, within the ASIC, processor, DSP, and so on, that may be used to reduce the search time by eliminating the channels based on the power spectral density.

Headings are included herein for reference and to aid in locating certain sections. These headings are not intended to limit the scope of the concepts described therein under, and these concepts may have applicability in other sections throughout the entire specification.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for locating cells in a wireless communication network, comprising:
    determining a first set of carrier frequencies to be searched based on signal strength characteristics at various carrier frequencies;
    calculating a power spectral density of one of the first set of carrier frequencies;
    comparing a metric of the power spectral density of the carrier frequency with a power spectral density threshold metric; and
    if the metric of the power spectral density of the carrier frequency meets the power spectral density threshold metric, including the carrier frequency in a second set of carrier frequencies to be searched.

2. The method of claim 1, wherein the metric is the variance of the power spectral density.

3. The method of claim 2, wherein if the variance of the power spectral density of the carrier frequency is more than the threshold variance, selecting another carrier frequency from the first set of carrier frequencies to be searched.

4. The method of claim 1, wherein the metric is the standard deviation of the power spectral density.

5. The method of claim 1, wherein the metric is the mean of the power spectral density.

6. The method of claim 1, wherein the calculating, the comparing, and the including are repeated for each of the frequencies in the first set of carrier frequencies to be searched.

7. The method of claim 1, wherein the metric of the power spectral density of each carrier frequency is compared twice against the power spectral density threshold metric.

8. The method of claim 1, further comprising:
    initially comparing a received signal power of one of the first set of carrier frequencies with a threshold received signal threshold;
    if the received signal power of the carrier frequency is less than the threshold received signal threshold, selecting another carrier frequency from the first set of carrier frequencies to be searched.

9. The method of claim 8, wherein if the received signal power of the carrier frequency is more than the threshold received signal threshold, then performing the calculating.

10. The method of claim 1, wherein the first set is a coarse set of frequencies and the second set is a fine set of frequencies.

11. An apparatus for locating cells in a wireless network, the apparatus comprising:
    a controller configured to execute:
        logic for determining a first set of carrier frequencies to be searched based on signal strength characteristics at various carrier frequencies;
        logic for calculating the power spectral density of one of the set of carrier frequencies; and
        logic for comparing a metric of the power spectral density of the carrier frequency with a power spectral density threshold metric,
    wherein if the metric of the power spectral density of the carrier frequency meets the power spectral density threshold metric, logic for including the carrier frequency in a second set of carrier frequencies to be searched.

12. The apparatus of claim 11, wherein the metric is the variance of the power spectral density.

13. The apparatus of claim 12, wherein if the variance of the power spectral density of the carrier frequency is more than the threshold variance, logic for selecting another carrier frequency from the first set of carrier frequencies to be searched.

14. The apparatus of claim 11, wherein the metric is the standard deviation of the power spectral density.

15. The apparatus of claim 11, wherein the metric is the mean of the power spectral density.

16. The apparatus of claim 11, wherein the logic for calculating, the logic for comparing and the logic for including operates on each of the frequencies in the first set of carrier frequencies to be searched.

17. The apparatus of claim 11, wherein the metric of the power spectral density of each carrier frequency is compared twice against the power spectral density threshold metric.

18. The apparatus of claim 11, further comprising:
    logic for initially comparing the received signal power of one of the set of carrier frequencies with a threshold received signal threshold; and
    if the received signal power of the carrier frequency is less than the threshold received signal threshold, selecting another carrier frequency from the set of carrier frequencies to be searched.

19. The apparatus of claim 18, wherein if the received signal power of the carrier frequency is more than the threshold received signal threshold, calculating the power spectral density of the carrier frequency.

20. The apparatus of claim 11, wherein the first set is a coarse set of frequencies and the second set is a fine set of frequencies.

21. An apparatus in a wireless communication system for locating cells in a wireless network, the apparatus comprising:
    means for determining a first set of carrier frequencies to be searched based on signal strength characteristics at various carrier frequencies;
    means for calculating the power spectral density of one of the set of carrier frequencies; and
    means for comparing the metric of the power spectral density of the carrier frequency with a power spectral density threshold metric,
    wherein if the metric of the power spectral density of the carrier frequency meets the power spectral density threshold metric, including the carrier frequency in a second set of carrier frequencies to be searched.

22. The apparatus of claim 21, wherein the metric is the variance of the power spectral density.

23. The apparatus of claim 22, wherein if the variance of the power spectral density of the carrier frequency is more than the threshold variance, logic for selecting another carrier frequency from the first set of carrier frequencies to be searched.

24. The apparatus of claim 21, wherein the metric is the standard deviation of the power spectral density.

25. The apparatus of claim 21, wherein the metric of the power spectral density of each carrier frequency is compared twice against the power spectral density threshold metric.

26. The apparatus of claim 21, further comprising:
    means for initially comparing the received signal power of one of the set of carrier frequencies with a threshold received signal threshold; and if the received signal power of the carrier frequency is less than the threshold received signal threshold, selecting another carrier frequency from the set of carrier frequencies to be searched.

27. The apparatus of claim 26, wherein if the received signal power of the carrier frequency is more than the threshold received signal threshold, calculating the power spectral density of the carrier frequency.

28. The apparatus of claim 21, wherein the first set is a coarse set of frequencies and the second set is a fine set of frequencies.

29. A non-transitory computer-readable medium comprising:
- a first set of codes for causing a computer to determine a first set of carrier frequencies to be searched based on signal strength characteristics at various carrier frequencies;
- a second set of codes for causing the computer to calculate the power spectral density of one of the set of carrier frequencies;
- a third set of codes for causing the computer to compare a metric of the power spectral density of the carrier frequency with a power spectral density threshold metric; and
- if the metric of the power spectral density of the carrier frequency meets the power spectral density threshold metric, including the carrier frequency in a second set of carrier frequencies to be searched.

30. The non-transitory computer-readable medium of claim 29, wherein the metric is the variance of the power spectral density.

31. The non-transitory computer-readable medium of claim 30, further comprising code for determining whether the variance of the power spectral density of the carrier frequency is more than the threshold variance, and if the variance is more, selecting another carrier frequency from the first set of carrier frequencies to be searched.

32. The non-transitory computer-readable medium of claim 29, wherein the metric is the standard deviation of the power spectral density.

33. The non-transitory computer-readable medium of claim 29, wherein the metric of the power spectral density of each carrier frequency is compared twice against the power spectral density threshold metric.

34. The non-transitory computer-readable medium of claim 29 further comprising:
- a further set of codes for causing the computer to initially compare the received signal power of one of the set of carrier frequencies with a threshold received signal threshold;
- if the received signal power of the carrier frequency is less than the threshold received signal threshold, selecting another carrier frequency from the set of carrier frequencies to be searched.

* * * * *